(12) United States Patent
Ko et al.

(10) Patent No.: US 9,443,443 B2
(45) Date of Patent: Sep. 13, 2016

(54) PERSONALIZED STUDYING PATH GENERATING METHOD IN SERIOUS GAME

(75) Inventors: Ilju Ko, Seoul (KR); Bokyung Sung, Seoul (KR); Jungsoo Kim, Seoul (KR); Junhyoung Park, Seoul (KR); Jinman Kwun, Seoul (KR)

(73) Assignee: FOUNDATION OF SOONGSIL UNIVERSITY-INDUSTRY COOPERATION, Seoul (KR)

(*) Notice: Subject to any disclaimer, the term of this patent is extended or adjusted under 35 U.S.C. 154(b) by 1325 days.

(21) Appl. No.: 12/591,999

(22) Filed: Dec. 7, 2009

(65) Prior Publication Data
US 2011/0136093 A1 Jun. 9, 2011

(51) Int. Cl.
G09B 7/00 (2006.01)
G09B 3/00 (2006.01)
G09B 7/06 (2006.01)

(52) U.S. Cl.
CPC . *G09B 7/00* (2013.01); *G09B 3/00* (2013.01); *G09B 7/06* (2013.01)

(58) Field of Classification Search
CPC .. G06Q 10/06; G06Q 10/10; G06Q 10/0637; G06Q 10/06316; G09B 7/00; G09B 7/02; G09B 7/06; G09B 3/00; G09B 3/02; G09B 5/00
USPC ........................................................ 434/322
See application file for complete search history.

(56) References Cited

U.S. PATENT DOCUMENTS

| | | | | |
|---|---|---|---|---|
| 6,551,109 B1* | 4/2003 | Rudmik | ................ | 434/322 |
| 6,688,889 B2* | 2/2004 | Wallace et al. | ................ | 434/322 |
| 7,389,208 B1* | 6/2008 | Solinsky | ................ | 703/2 |
| 7,736,150 B2* | 6/2010 | Pfund | ................ | 434/322 |
| 8,175,511 B1* | 5/2012 | Sordo et al. | ................ | 434/350 |
| 2002/0160347 A1* | 10/2002 | Wallace et al. | ................ | 434/322 |
| 2004/0033475 A1* | 2/2004 | Mizuma et al. | ................ | 434/219 |
| 2005/0096950 A1* | 5/2005 | Caplan et al. | ................ | 705/7 |
| 2006/0167784 A1* | 7/2006 | Hoffberg | ................ | 705/37 |
| 2009/0018984 A1* | 1/2009 | Solinsky | ................ | 706/12 |
| 2010/0041007 A1* | 2/2010 | Wang | ................ | 434/322 |
| 2010/0235285 A1* | 9/2010 | Hoffberg | ................ | 705/75 |
| 2011/0261049 A1* | 10/2011 | Cardno et al. | ................ | 345/419 |

* cited by examiner

*Primary Examiner* — Nikolai A Gishnock
(74) *Attorney, Agent, or Firm* — Kile Park Reed & Houtteman PLLC

(57) ABSTRACT

The present invention relates to a personalized studying path generating method in a serious game. The personalized studying path generating method in the serious game according to the present invention comprises (a) generating serious criteria on a learning ability based on study elements required for the serious game and a relation between the study elements; (b) projecting user information and target information onto the serious criteria; (c) simplifying first criteria which the user information is projected onto and second criteria which the target information is projected onto by reducing a dimension of the first criteria and the second criteria; (d) comparing the simplified first and second criteria; (e) generating a personalized optimum studying path from the first to the second criteria; and (f) studying according to the optimum studying path. Accordingly, the present invention sets a personalized studying path by evaluating user's learning ability according to a standard and enables a user to play the game according to his/her ability to thereby improve study efficiency. Also, the present invention may minimize difference of study efficiency arising from different study inclination and circumstances between individuals.

8 Claims, 5 Drawing Sheets
(2 of 5 Drawing Sheet(s) Filed in Color)

PERSONALIZED STUDYING PATH GENERATING METHOD IN SERIOUS GAME

BACKGROUND OF THE INVENTION

1. Field of the Invention

Methods consistent with the present invention relate to a personalized studying path generating method in a serious game, and more particularly, to a method of evaluating a user's learning ability and providing a studying path in a serious game.

2. Description of the Related Art

A serious game which incorporates various functions such as education, health and training into an entertaining function of games has drawn much attention in recent years.

The complexity of the modern society and rapid change in technology are extending the education market and reeducation market and the change becomes faster. To that end, the serious game can be valued as a technology which adapts to the changed needs.

The serious game is at its initial phase of industry and evaluated as one of the most promising areas, obtaining massive investment from the governments and companies. Particularly, the recent success of Wii and DS of Nintendo presents a good example of the promising serious game.

From the aspect of accomplishment of a target function as well, the serious game has proven its effect. Study on the serious game is most active in a graphic acceleration technique and an interface technique for learning by immersion.

However, while the serious game is produced for purposes of developing and training a particular function, study is not very active in presenting a personalized studying path by evaluating or measuring a user's personal learning ability. Certain credits are given to a user upon completion of the game, and this is not a standard and is not enough to evaluate a user's learning ability.

Currently, measurement and evaluation of a user's learning ability are dependent upon a manual work of specialist groups and offline surveys with questionnaire.

Such a passive measurement system which is present in the distribution and consumption processes harms the high efficiency of the serious game. Also, taking into account demands for the serious game from individuals and companies, automated setting of a personalized studying path and measuring technique of study efficiency are badly needed to improve quality of the serious game and to enhance application.

SUMMARY OF THE INVENTION

Accordingly, it is an aspect of the present invention to provide a personalized studying path generating method in a serious game which sets a personalized studying path and enables a user to play the serious game in consistent with his/her learning ability evaluated in accordance with a standard. This is to minimize a gap of study efficiency between individuals which is caused by different study inclination and circumstances by providing the same study standard.

Additional aspects and/or advantages of the present invention will be set forth in part in the description which follows and, in part, will be obvious from the description, or may be learned by practice of the present invention.

The foregoing and/or other aspects of the present invention are also achieved by providing a personalized studying path generating method in a serious game, the method comprising (a) generating serious criteria on a learning ability based on study elements required for the serious game and a relation between the study elements; (b) projecting user information and target information onto the serious criteria; (c) simplifying first criteria which the user information is projected onto and second criteria which the target information is projected onto by reducing a dimension of the first criteria and the second criteria; (d) comparing the simplified first criteria and the simplified second criteria; (e) generating a personalized optimum studying path from the simplified first criteria to the simplified second criteria; and (f) studying according to the personalized optimum studying path.

The studying method of the serious game further comprises (g) updating the user information based on the study result data if the study result data are out of a critical value, projecting the updated user information onto the serious criteria, and then updating the personalized optimum studying path by re-performing the operations (c) to (f).

The serious criteria are discrete measurement criteria of the learning ability and are generated as an eigenspace through a machine learning process after a standardization of the study elements.

The user information comprises user physical ability information and user environmental information.

The operation (c) comprises transforming the first criteria and the second criteria from high dimensions to low dimensions by using a dimensionality reduction algorithm such as a principal component analysis (PCA) or curvilinear component analysis (CCA).

The serious criteria are generated through the machine learning by unsupervised boosting after normalizing the study elements included in the serious game by field independent clustering.

The user information initially is based on information input by a user and/or information acquired from a test game and then updated according to user's study history information.

The operation (d) comprises determining a location of a characteristic point focusing on a big difference point between the simplified first criteria and the simplified second criteria; and matching similarity points between the two criteria by measuring a volume and a direction of changed energy from the location of the characteristic point.

The operation (e) comprises generating an intermediate path by applying a shape transformation process between the simplified first criteria and the simplified second criteria based on the similarity points; and collecting a study data which are appropriate for each step of the intermediate path.

The operation (e) comprises generating the personalized optimum studying path at multi steps by searching an intermediate transformation process between the simplified first criteria and the simplified second criteria based on the similarity points.

The foregoing and/or other aspects of the present invention are also achieved (a) generating serious criteria on a learning ability based on study elements required for the serious game and a relation between the study elements; (b) generating target criteria by projecting target information on target learning ability onto the serious criteria; (c) generating user criteria by projecting user information onto the serious criteria; (d) simplifying the target criteria and the user criteria to generate a target map and a user map; (e) comparing the target map and the user map; (b) generating a personalized optimum studying path from the user map to the target map; and (g) studying according to the optimum studying path.

The operation (e) comprises determining a location of a characteristic point focusing on a big difference point between the user map and the target map; and matching similarity points between the two criteria by measuring a volume and a direction of changed energy from the location of the characteristic point.

The operation (e) comprises generating an intermediate path by applying a shape transformation process between the user map and the target map based on the similarity points, and collecting a study data which are appropriate for each step of the intermediate path.

The operation (f) comprises generating the personalized optimum studying path at multi steps by searching an intermediate transformation process between the user map and the target map based on the similarity points.

BRIEF DESCRIPTION OF THE DRAWINGS

The patent or application file contains at least one drawing executed in color. Copies of this patent or patent application publication with color drawings will be provided by the Office upon request and payment of the necessary fee.

The above and/or other aspects of the present invention will become apparent and more readily appreciated from the following description of the embodiments, taken in conjunction with the accompanying drawings of which.

DETAILED DESCRIPTION OF EXEMPLARY EMBODIMENT

Hereinafter, exemplary embodiments of the present invention will be described with reference to accompanying drawings, wherein like numerals refer to like elements and repetitive descriptions will be avoided as necessary.

Figure 1:
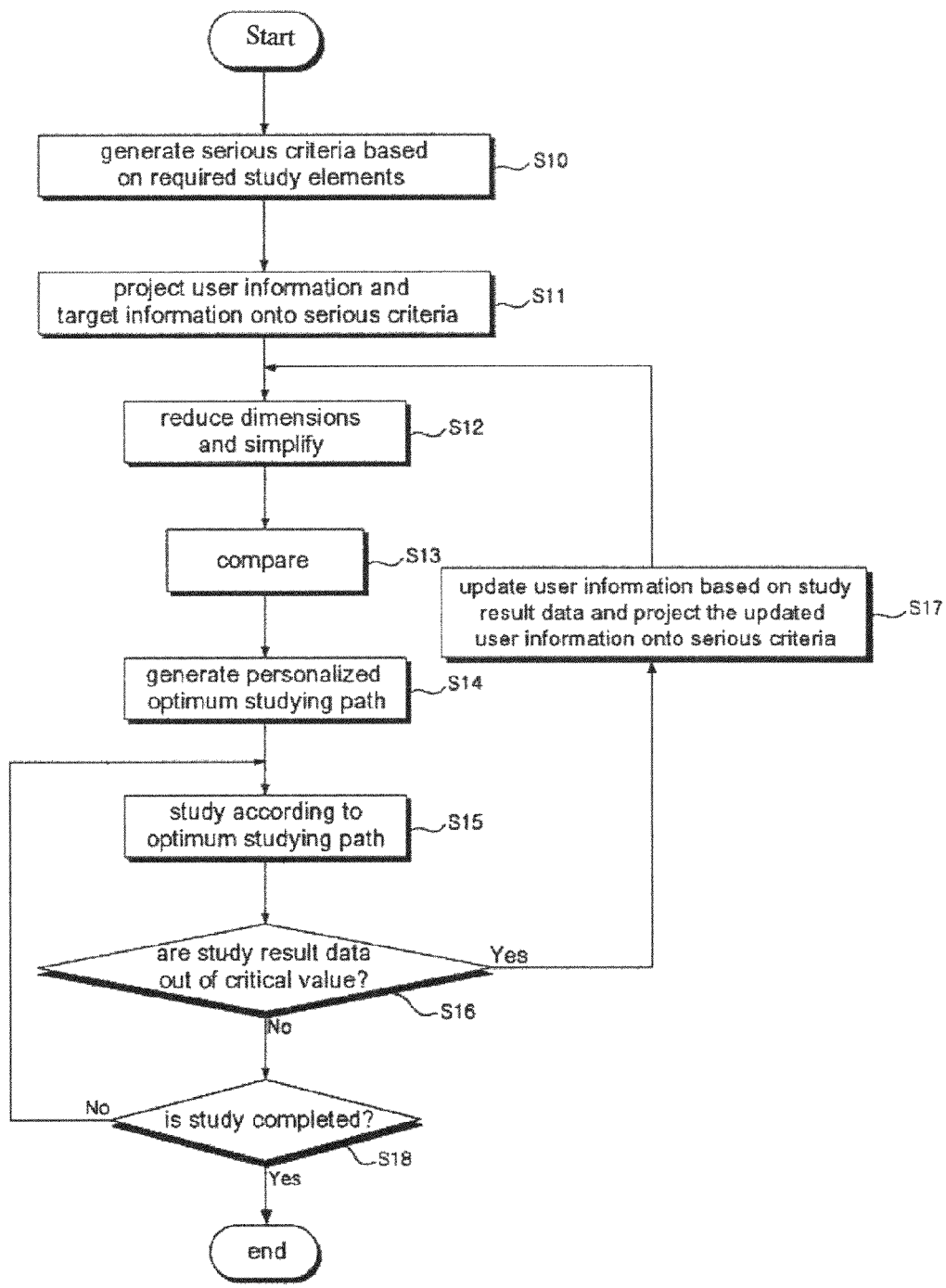
FIG. 1 is a flowchart which illustrates a personalized studying path generating method in a serious game according to an exemplary embodiment of the present invention.

FIG. 1 is a flowchart which illustrates a personalized studying path generating method in a serious game according to an exemplary embodiment of the present invention.

Referring to FIG. 1, the personalized studying path generating method in the serious game according to the present exemplary embodiment generates serious criteria based on study elements (to be also called "serious elements") required for the serious game and the relationship between the study elements (S10).

To minimized a gap of study efficiency arising from different study inclination and environments between individuals, a standard for discretely analyzing personal information and measuring an individual's study status should be provided. To provide the foregoing standard according to the present invention, serious criteria are generated by evaluating data of serious elements included in each serious game.

The serious criteria are an eigenspace which is a discrete measurement standard for user information used in the serious game, and are established through a machine learning process based on the relation between study elements required for each serious game.

Figure 2:
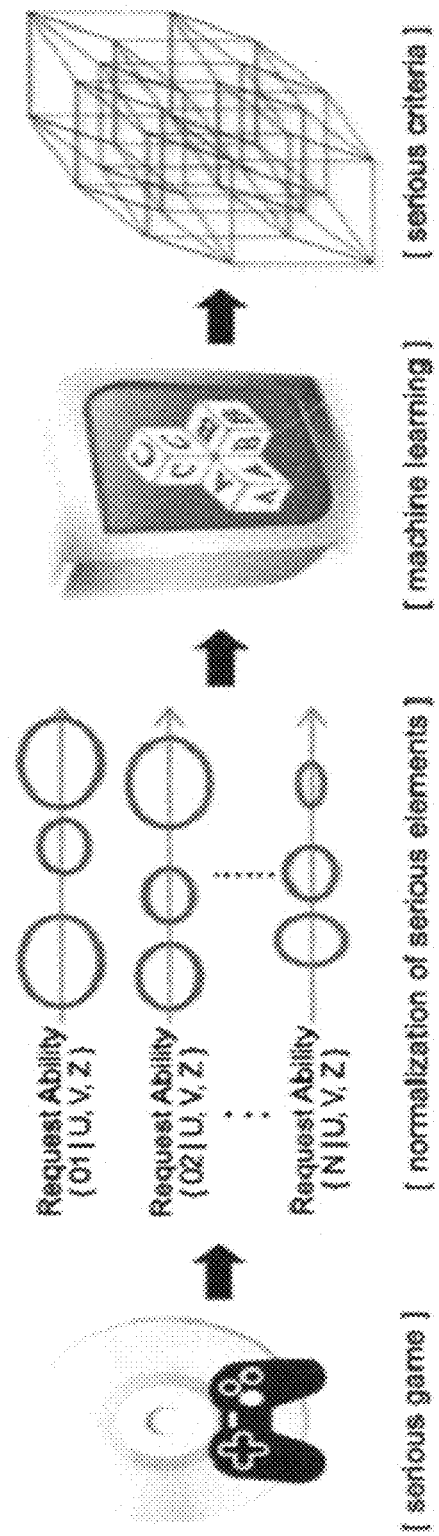
FIG. 2 illustrates a process of generating serious criteria according to the exemplary embodiment of the present invention.

FIG. 2 illustrates a process of generating the serious criteria according to the exemplary embodiment of the present invention. As shown therein, the study elements included in the serious game are normalized by field independent clustering to generate the serious criteria through the machine learning by unsupervised boosting. The serious criteria are formed independently for each game based on the requested study elements taken into account during the production of the serious game since each serious game requires different serious elements.

Hereinafter, the serious criteria generating method will be exemplified by a process of generating serious criteria with respect to a serious game for purposes of studying math.

Study Elements in Game

The entire game is composed of several units to study a plurality of math theories. For example, the units may be defined by several standards, e.g., a basic learning list, a previous relevant unit list, a subsequent relevant unit list, and the degree of difficulty.

For example, the unit "calculation of matrix" for the $10^{th}$ grade math may be defined as (basic learning: linear algebra, algebra, analytics, . . . ), (previous relevant unit: linear equations, matrix, . . . ), (subsequent relevant unit: simultaneous equations of matrix, the vector space and matrix, . . . ), and (the degree of difficulty: high).

Normalization of Study Elements

The serious game is divided into a plurality of sections, and each section is defined and realized on the basis of the basic form. As for the serious game for the purposes of the math study above, the plurality of sections includes units and the definition may be the same as above.

The number of items in each element within the definition and the length of specific lists of each element depend on the circumstances, and a normalization process for the difference is required. The normalization process is a pre-treatment process for a course of study having definition elements of the game as the basic data.

The normalization may employ, e.g., a standard normalization or zero padding normalization technique. If the standard normalization technique is used, data are normalized on the basis of an average value of the length of the specific list and the number of items. Meanwhile, if the zero padding normalization technique is used, the normalization is performed by inserting zero into a blank of data based on the maximum value of the length of the specific list and the number of items.

Machine Learning—Generation of Serious Criteria

After the normalization of the study elements in the serious game, the serious criteria are generated through a machine learning by boosting. The boosting type is a studying algorithm which generates a strong detector by combination of simple detectors based on simple forms. For example, among algorithms of the boosting type, adaboost which is determined to be appropriate for generating the eigenspace considering the relation may be amended and used in consistent with the generation of the serious criteria.

The foregoing technique is studied by receiving definition data of a game normalized by unsupervised type and may derive a result which is similar to that of the studying algorithm by general boosting. The technique may apply to a strong classifier which is a consecutive combination of weak classifiers determining simple characteristics.

In generating the serious criteria, each of the weak classifiers which consist of the strong classifier extracted from the machine learning phase is considered as one of space axes projecting data. It may be determined as a classification standard for a single characteristic of a single weak classifier and the definition of the character. That is, consecutive weak classifiers may be deemed as multidimensional serious criteria projecting data of the serious game.

Projection of Serious Criteria

Once the serious criteria for the serous game are generated, user information and target information are projected onto the serious criteria (S11). The user information may include, e.g., user's current physical ability information (e.g. eyesight, recognition response rate, concentration, etc.), environmental information (location, time, cumulative study records, etc.) and learning ability information, and the user information required for the game's attribute may vary. The user information may initially be based on information input by a user and/or information acquired from a test game and then updated according to user's study history information. For example, as for the serious game for the purposes of math study, the user initial information include data of a candidate user's basic math ability and a user may not have much understanding on some units relevant to the existing academic year.

Meanwhile, the target information means information on the level a user desires to reach through study and can be referred to as expert information. For example, as for the serous game for the purposes of the math study, the target information includes study result data of a user who has completed the course of study higher than the target standard. This may include an assumption that a user has equivalent high understanding on all of the units relevant to the existing academic year.

Figure 3:
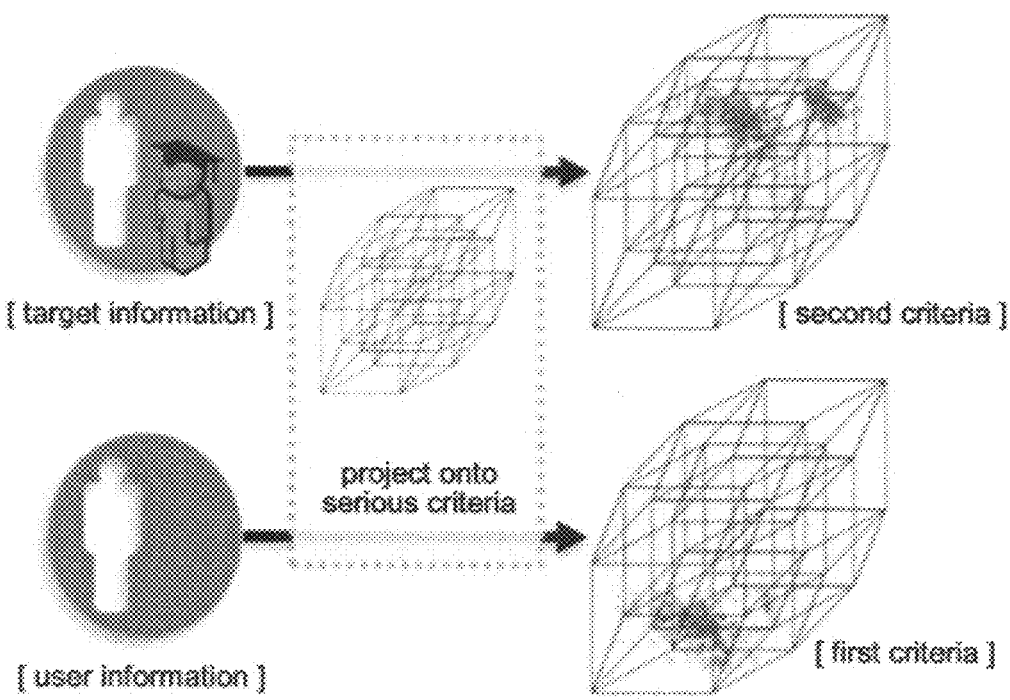
FIG. 3 is a diagram of user information and target information reflected in the serious criteria according to the exemplary embodiment of the present invention.

FIG. 3 is a diagram of user information and target information projected onto the serious criteria according to the exemplary embodiment of the present invention. Referring to FIG. 3, the user information and the target information are projected onto the serious criteria. The present invention has great meaning in that it can evaluate a user's learning ability according to standards through projection of user data onto the serious criteria.

Serious criteria which project the user information are called first criteria (to be also called user criteria) while criteria which project the target information are called second criteria (to be also called target criteria).

As shown in FIG. 2, the data projected onto the serious criteria are multidimensional. The multidimensional data are not easy to calculate by comparison. Thus, in the present invention, the multidimensional data are reduced and simplified (S12).

Simplification

Figure 4:
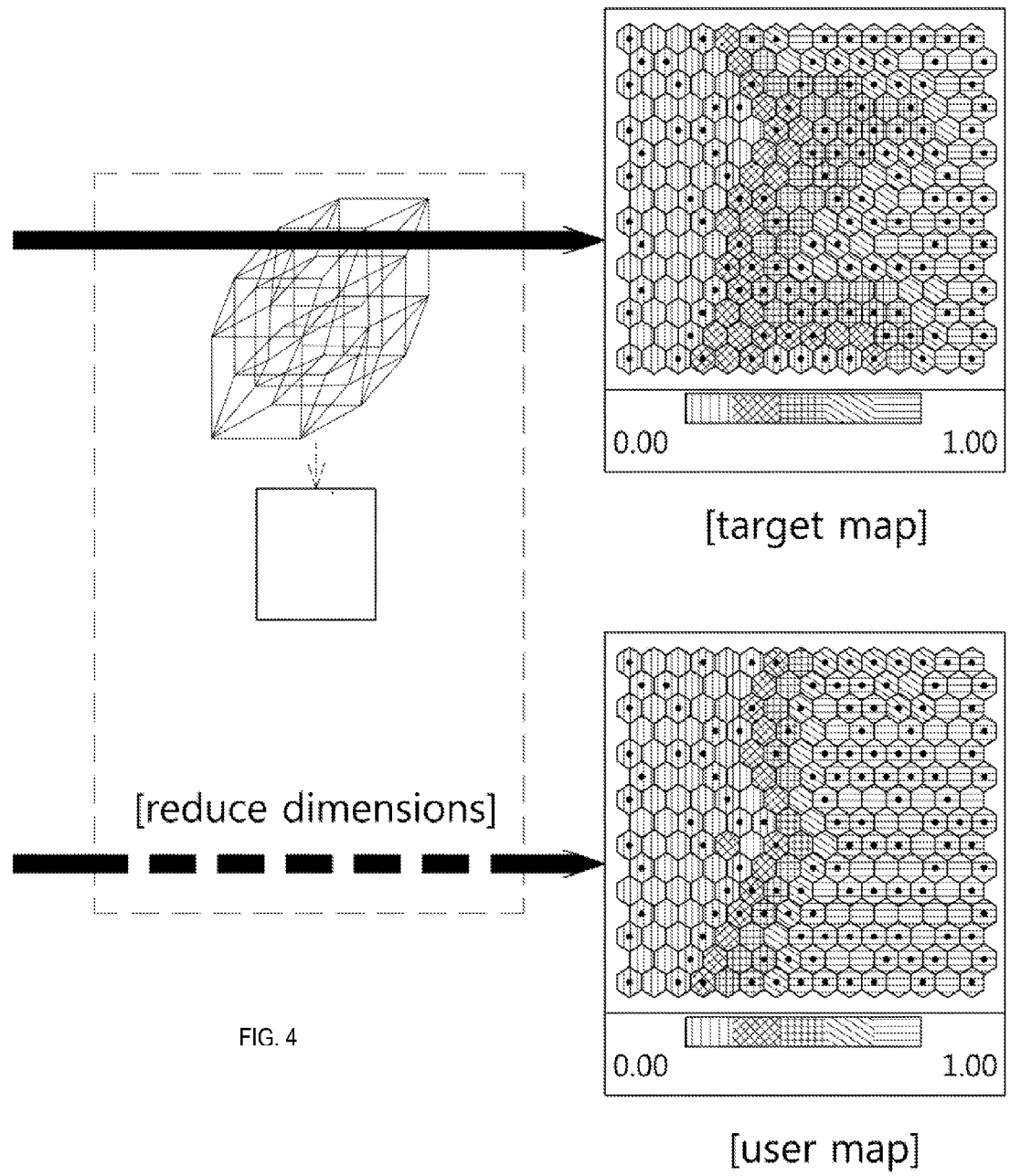
FIG. 4 is a diagram of maps which are generated by simplified first and second models according to the exemplary embodiment of the present invention.

FIG. 4 is a diagram of maps which are generated by the simplified first criteria and second criteria according to the exemplary embodiment of the present invention. FIG. 4 illustrates two dimensional data reduced from the multidimensional criteria.

Exemplifying the serious game for the purposes of the math study, space axes of the serious criteria are study elements which are bases for each unit (e.g., s-norm operation, t-norm operation, linear equation and differential equation). The study elements are incorporated into a single axis to the extent that the loss of data projected onto the study elements is minimum, thereby reducing the dimensions as a whole.

The reduction of the dimensions from high to low is to minimize information loss and maintain efficient calculation complexity. The reduction of the dimensions is performed through a proven dimensionality reduction algorithm, e.g., principal component analysis (PCA), curvilinear component analysis (CCA), etc.

The CCA focuses on minimizing loss of local information rather than the overall data and is very appropriate for the present invention.

Otherwise, dimensionality reduction algorithms may be used. The first criteria data and the second criteria data which are processed by the foregoing dimension reduction are called a user map and a target map, respectively.

The dimensions may preferably be reduced to two dimensions. A point in the two dimensions includes various reference attributes through its location values (coordinates X and Y) and the value stored by a variable itself.

Map Comparison

After the simplification process, the two maps are compared to extract similarities and differences therebetween (S13).

If personal information is present individually, a passive analysis by a person is available. According to the present invention, however, the information is projected onto the space under the same standards to make the comparison available. The user map and the target map which are transformed to low dimensions may be compared in a relatively smaller calculation volume than high dimensions.

First, a characteristic point is determined from both maps focusing on the place where the difference value is high based on the fluctuation of a graph. The amount and direction of the changed energy from each location of the maps may be measured. The two maps are compared on the basis of the characteristic points to find a similarity point. The reason why the similarity point is found first is to derive a course of learning considering different elements than common attributes of the maps.

More specifically, a reference comparison unit is set to compare the two maps. For example, 3*3 pixels, i.e., a total of nine pixels, may be set as a block unit. The size of the block may be larger, but a larger block makes the map simplified. Thus, it would be better to set an appropriate size.

Then, a comparison candidate group is selected. For example, the block is masked in transverse and vertical directions to calculate a difference value between a center pixel and peripheral pixels of the block. Then, an absolute value is obtained and a maximum value is selected. The direction information based on the center pixel is also stored. In the overall map, the block whose maximum value is smaller than a critical value is removed. The critical value may vary as the case may be. For example, the critical value may be set as top 10%.

Then, the similarity points are matched in consideration of the absolute value and the direction value of the comparison candidate groups.

Generation of Personalized Optimum Studying Path

Figure 5:
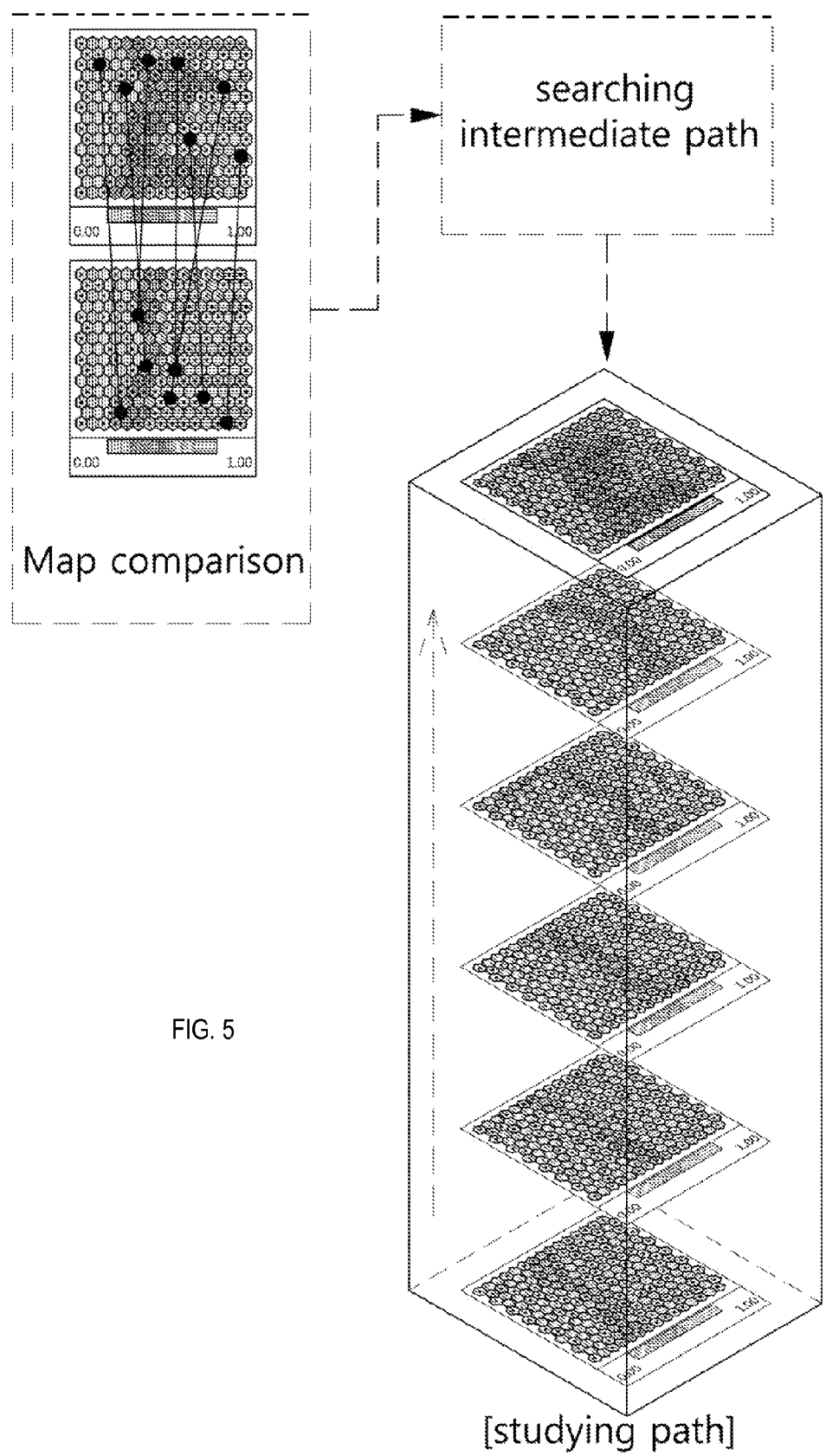
FIG. 5 is a diagram of a personalized optimum studying path by comparison of two maps.

After the matching process, the personalized optimum studying path is generated (S14). FIG. 5 is a diagram of the personalized optimum studying path generated by comparison of two maps.

The user map and the target map mean a start and an end of the studying path, respectively. The similarity point calculated from the two maps is the base for deriving an intermediate process between the start and the end. That is, this step searches a transformation of the user map until it is similar to the target map.

According to the present invention, a shape transformation algorithm may apply in generating an intermediate path. This algorithm is used to derive an optimum transformation process between two different objects in the computer graphic area, and is appropriate for searching the transformation process.

If the intermediate path is generated, study data which are appropriate for each step of the intermediate path are collected to generate a single personalized optimum studying path. For example, each step of the intermediate path may have study result data required to go over the step. The present invention collects appropriate study data at a time to generate a single personalized studying path. The generation of the personalized studying path may indicate a length of the intermediate study phase or the difference of the order of study by the user map.

Referring to FIG. 5, four intermediate paths (studying paths) are generated between the user map and the target map. It is preferable to search the shortest transformation step resulting in the shortest course, but other standards (if any) may apply, too.

If the optimum studying path is generated by calculating the minimum serious elements required for the serious game with the foregoing process, the personalized optimum studying path is provided for a user's study, and the user may play game (S15).

A user studies all of the courses in the studying path of the serous game through the personalized studying path, and study result data generated in each study path is cumulatively stored as temporary user information. If a user completes the studying path, he/she may reach the target information at the shortest distance.

Update of the Personalized Optimum Studying Path

According to the present invention, determine if the studying path is suitable for the user based on the user's study result data. However, if user's study result data are out of the critical value at each step, the studying path should be updated. If user's study result data are out of the critical value required at each step, it means that a user does not follow the optimum studying path efficiently. Then, the studying path should be amended. The critical value varies according to the margin of error at each step.

Accordingly, If user's study result data are out of the critical value required at each step (S16), the user information is amend and updated on the basis of the study result data (S17), goes through the simplification and comparison processes to thereby generate another personalized optimum studying path (S11 to S14). Until the completion of the study (S18), i.e., until a user completes the personalized studying path, the processes are repeated.

According to the present invention, the initial user information or the user's study status information (i.e. user's current learning ability) are discrete based on the eigenspace to thereby generate the personalized studying path and automatically measure the study status at each step. The user's study status is variable due to difference between individuals. Thus, the studying path is updated by comparison of the critical value with the expert at each step.

The present invention automatically generates a personalized studying path taking into account a person's study status, and performs an intermediate checkup and automatically analyzes the current status. Thus, it is effective for a person to study according to his/her inclination through the serious game.

The present invention not only presents the standardized serious standard but also measures a user's learning ability by projecting user data onto the serious criteria. The measurement of the learning ability means estimation of expertness information of study, time and process required for being an expert as well as the measurement of the figures.

The effect of the present invention will be a key factor to apply the serious game to various areas.

The present invention enables systemic management for employees training and efficient human resources management, and may be used for utilization, estimation and grouping of the human resources.

According to another exemplary embodiment of the present invention, after the target criteria are generated first by projecting the target information onto the target criteria, the target criteria may apply to generate the studying path by a user.

The foregoing present invention may be realized by a software algorithm applicable to a general-purpose serious game. Also, the foregoing present invention may be realized by a device which includes a memory storing therein the concerned algorithm and a processor for executing the algorithm.

Particularly, the present invention may be applicable to various devices such as a game console, a mobile phone, a PDA and a PC which support the serious game.

As described above, the present invention sets a personalized studying path by evaluating user's learning ability according to a standard and enables a user to play the game according to his/her ability to thereby improve study efficiency. Also, the present invention may minimize difference of study efficiency arising from different study inclination and circumstances between individuals.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A computer program product comprising a non-transitory computer-readable medium, wherein the non-transitory computer-readable medium comprises code that, when executed by a computer, causes the computer to perform:

(a) generating multidimensional serious criteria on a learning ability based on study elements required for a serious game and a relation between the study elements;

(b) generating multidimensional target criteria by projecting target information onto the multidimensional serious criteria;

(c) generating multidimensional user criteria by projecting user information onto the multidimensional serious criteria;

(d) generating a two-dimensional (2D) target map displayed in a computer graphic area by transforming the multidimensional target criteria to lower dimensions;

(e) generating a 2D user map displayed in the computer graphic area by transforming the multidimensional user criteria to lower dimensions;

(f) comparing the 2D target map and the 2D user map by:
determining locations of characteristic points in the 2D target map and in the 2D user map;
measuring an amount and a direction of changed energy from each of the locations of the characteristic points in the 2D target map and from each of the locations of the characteristic points in the 2D user map by calculating a difference value between pixels of the 2D target map and a difference value between pixels of the 2D user map; and
determining similarity points between the 2D target map and the 2D user map based on the measuring;

(g) generating a personalized optimum studying path by generating one or more intermediate paths displayed in the computer graphic area between the 2D user map and the 2D target map, wherein the one or more intermediate paths are generated by performing a shape transformation algorithm based on the 2D user map, the 2D target map, and the similarity points;

(h) providing training data corresponding to data from the one or more intermediate paths according to the personalized optimum studying path;

(i) generating study result data in each of the one or more intermediate paths and cumulative study result data by accumulating the study result data in each of the one or more intermediate paths;

(j) updating the user information based on the cumulative study result data if the cumulative study result data are out of a critical value; and (k) projecting the updated user information onto the multidimensional serious criteria, and then updating the personalized optimum studying path by re-performing the operations (c) and (e) to (g) and automatically re-performing the operations (h) and (i) according to the updated personalized optimum studying path until when the cumulative study result data are within the critical value, wherein a processor executes the shape transformation algorithm stored in a memory associated with the processor.

2. The computer program product according to claim 1, wherein the user information comprises user physical ability information and user environmental information.

3. The computer program product according to claim 1, wherein the generating the 2D target map comprises generating the 2D target map by simplifying the multidimensional target criteria using a principal component analysis (PCA) or curvilinear component analysis (CCA), and wherein the generating the 2D user map comprises generating the 2D user map by simplifying the multidimensional user criteria using a PCA or CCA.

4. The computer program product according to claim 1, wherein the user information initially is based on information input by a user and information acquired from a test game and then updated according to user's study history information.

5. A personalized studying path generating method in a serious game, the method comprising:

(a) generating, in a game console, multidimensional serious criteria on a learning ability based on study elements required for the serious game and a relation between the study elements;

(b) generating, in the game console, multidimensional target criteria by projecting target information on target learning ability onto the multidimensional serious criteria;

(c) generating, in the game console, multidimensional user criteria by projecting user information onto the multidimensional serious criteria;

(d) generating, in the game console, a two-dimensional (2D) target map displayed a in computer graphic area by transforming the multidimensional target criteria to lower dimensions;

(e) generating, in the game console, a 2D user map displayed in the computer graphic area by transforming the multidimensional user criteria to lower dimensions;

(f) comparing, in the game console, the 2D target map and the 2D user map by:

determining locations of characteristic points in the 2D target map and in the 2D user map;

measuring an amount and a direction of changed energy from each of the locations of the characteristic points in the 2D target map and from each of the locations of the characteristic points in the 2D user map by calculating a difference value between pixels of the 2D target map and a difference value between pixels of the 2D user map; and determining similarity points between the 2D target map and the 2D user map based on the measuring;

(g) generating, in the game console, a personalized optimum studying path by generating one or more intermediate paths displayed in the computer graphic area between the 2D user map and the 2D target map, wherein the one or more intermediate paths are generated by performing a shape transformation algorithm based on the 2D user map, the 2D target map, and the similarity points;

(h) providing, in the game console, training data corresponding to data from the one or more intermediate paths according to the personalized optimum studying path;

(i) generating study result data in each of the one or more intermediate paths and cumulative study result data by accumulating the study result data in each of the one or more intermediate paths;

(j) updating the user information based on the cumulative study result data if the cumulative study result data are out of a critical value; and (k) projecting the updated user information onto the multidimensional serious criteria, and then updating the personalized optimum studying path by re-performing the operations (c) and (e) to (g) and automatically re-performing the operations (h) and (i) according to the updated personalized optimum studying path until when the cumulative study result data are within the critical value, wherein a processor executes the shape transformation algorithm stored in a memory associated with the processor.

6. The method according to claim 5, wherein the user information comprises user physical ability information and user environmental information.

7. The method according to claim 5, wherein the generating the 2D target map comprises generating the 2D target map by simplifying the multidimensional target criteria using a principal component analysis (PCA) or curvilinear component analysis (CCA), and wherein the generating the 2D user map comprises generating the 2D user map by simplifying the multidimensional user criteria using a PCA or CCA.

8. The method according to claim 5, wherein the user information initially is based on information input by a user and information acquired from a test game and then updated according to user's study history information.

* * * * *